US006763754B1

(12) United States Patent
Glenn

(10) Patent No.: US 6,763,754 B1
(45) Date of Patent: Jul. 20, 2004

(54) SAW BLADE GUIDE

(76) Inventor: Richard D. Glenn, #4 Shope Creek Estates Dr., Asheville, NC (US) 28805

( * ) Notice: Subject to any disclaimer, the term of this patent is extended or adjusted under 35 U.S.C. 154(b) by 2 days.

(21) Appl. No.: 10/403,965

(22) Filed: Apr. 1, 2003

(51) Int. Cl.[7] .............................................. B23Q 17/22
(52) U.S. Cl. .............................. 83/745; 83/574; 33/640
(58) Field of Search .......................... 83/745, 574, 829; 33/630, 640

(56) References Cited

U.S. PATENT DOCUMENTS

| | | |
|---|---|---|
| 3,979,987 A | 9/1976 | Mayhew et al. |
| 3,983,776 A * | 10/1976 | Flanders ...................... 83/745 |
| 4,014,236 A | 3/1977 | Neal |
| 4,125,942 A | 11/1978 | Horner et al. |
| 4,128,030 A | 12/1978 | Kundikoff |
| 4,135,419 A | 1/1979 | Chapin |
| 4,356,748 A * | 11/1982 | Tilton ........................... 83/745 |
| 4,404,753 A | 9/1983 | Klok |
| D345,514 S | 3/1994 | Donnelly |
| 5,390,425 A | 2/1995 | Gilberts |
| 5,787,599 A | 8/1998 | Clifton |
| 5,813,126 A | 9/1998 | Dahl |
| 6,256,899 B1 | 7/2001 | McGhee |
| 6,604,296 B2 * | 8/2003 | Mastrobattista .............. 33/640 |

* cited by examiner

Primary Examiner—Kenneth E. Peterson
(74) Attorney, Agent, or Firm—Stuart D. Frenkel

(57) ABSTRACT

An improved guide for a handheld power cutting tool and for providing an adjustment to compensate for the distance between the blade of a cutting tool and the end of the sole plate which typically surrounds the blade, includes a base, a guide at the end of the base for contacting the edge of the guide plate of the cutting tool, a carriage assembly movable relative to the base, a carriage stop movable on the base to a set distance from the carriage assembly which can be adjusted to equal the distance between the saw blade and the end of the sole plate, the carriage stop being lockable to the base, a friction surface between the workpiece and the underside of the carriage assembly such that when the base is moved, the carriage assembly remains stationary with respect to the workpiece.

21 Claims, 3 Drawing Sheets

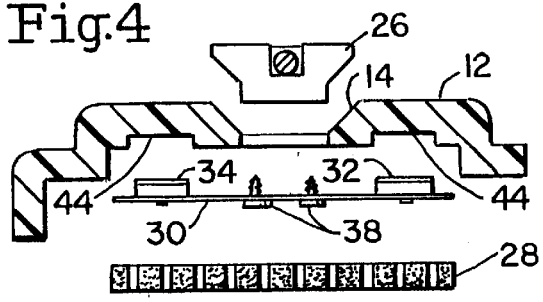
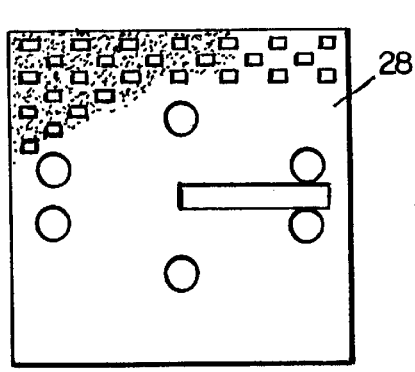
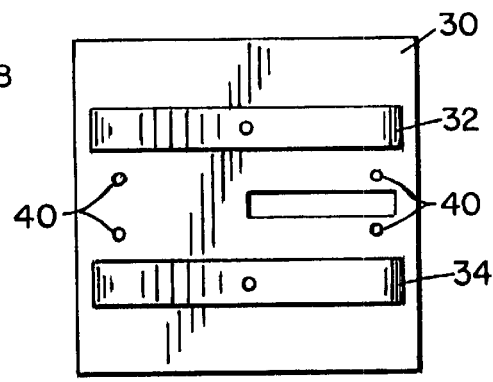
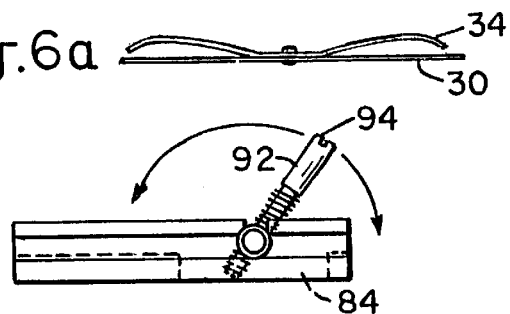
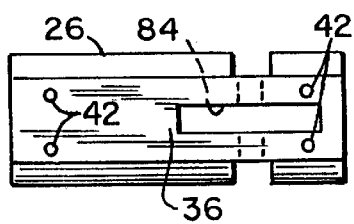
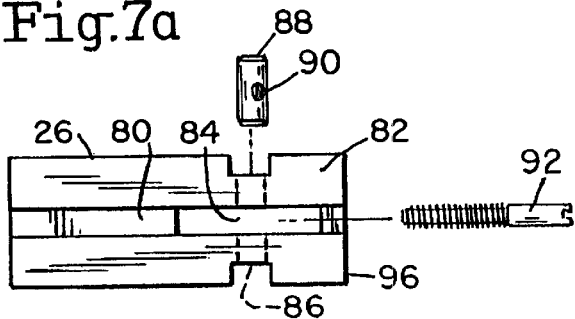

SAW BLADE GUIDE

FIELD OF THE INVENTION

The present invention relates to an improved guide for a hand held power cutting tool and, more particularly, to a guide for a hand held power cutting tool of the type having a blade extending through a base plate and wherein the guide is adjustable to compensate for an offset distance between an edge of the base plate and the blade of the cutting tool.

BACKGROUND OF THE INVENTION

Conventional carpentry practice in cutting a board is first to utilize a square and/or ruler to position and then mark the intended line of cut. The workman then manually aligns the blade of the saw, sighting through the opening in the saw platform, and aligns the blade with the scribed line. The workman then begins cutting, maintaining alignment by making minute corrections as required. The vibration of the saw, and the binding effect of corrections limits the ability to track the line after any deviation. Thus, even experienced carpenters will at times deviate from the intended line by an amount sufficient to make the completed parts unusable.

If an attempt is made to correct the deficiencies of the manual technique by utilizing the edge of the saw platform as a follower, then additional time consuming steps must be taken. A straight edge must be secured into position at the right distance from the scribed line. This distance must be determined by measurement or experimentation and is difficult to plot accurately. Then the straight edge must be clamped or otherwise mechanically secured in position.

Numerous types of guides for use in connection with hand held power-cutting tools are known in the art. Many such prior art devices, however, have the disadvantages of being unduly complicated and often difficult to use. Other such prior art devices encounter difficulties in aligning the guide device in spaced relation to the desired cut line to allow for the distance between the blade and the edge of the base plate through which the blade extends.

There have been various types of guide apparatus for power tools having blades such as sabre saws and circular saws. Most of the guide apparatus for the saws have included an integral guide channel secured to the base plate of the saw. The channel cooperates with a guide flange secured to either a table or to the work which is to be sawed. Typically, the guide apparatus of the prior art includes an upwardly extending flange which is secured adjacent to the desired cut at a fixed distance therefrom. The saw, with its guide channel inverted so as to receive the upwardly extending flange, is placed on the guide apparatus with the channel and flange matingly engaged for movement only along the channel. The saw is then guided as the channel moves along the flange. In some cases, there is a guide channel on each side of the sole plate or shoe of the saw.

Since the guide channel is integral with the sole plate or shoe, each saw must have its own respective sole plate or shoe for use with the guided apparatus. That is the guide apparatus is designed and adaptable only to one specific make of saw. The prior art does not include a universal guide apparatus, which can be used with virtually any saw. Since the sole plates or shoes of the saws include guide channels, the manufacturers of the saws themselves must include the guide apparatus with the basic saw since the sole plate or shoe is normally not a replaceable item separate and apart from the saw itself. The sole plate or shoe of a saw is normally secured to the saw housing and motor as an integral part thereof, and is not normally replaceable. Accordingly, it is necessary that each manufacturer of saws include some type of guide apparatus either as an optional configuration of a saw or else as a standard item with the saw. If the saw is not to be used with the guide apparatus, nevertheless the guide channels are a part of the saw in prior art apparatus.

One of the inherent problems associated with the development of a universal carrier and guide channel apparatus to fit a number of different saws has been the multiplicity of designs of saw sole plates or shoes. The width of the sole plate or shoe varies from about 2⅛ inches to about 2⅞ inches for the most common sabre saws. However, there are circle saws that vary in width from 3¼ inches to 4 inches, and up to about 5½ inches. Moreover, some of the shoes are curved upwardly at the front end, and some are flat without any upward curvature. Some have upwardly extending lips on the side edges of the shoes while others are flat. All in all, it appears that there are almost as many variations in cutting tool sole plates, or shoes, as there are manufacturers of cutting tools, or even more due to variations between models by the same manufacturer.

SUMMARY OF THE INVENTION

An object of the invention is to provide a guide for hand held power cutting tools of various sizes and in which means are provided to position the straight edge of the guide a predetermined distance from a desired cut line, depending on the offset position of the blade extending through the base plate.

Another object of this invention is to provide a guide for a hand held power cutting tool in which the guide is easily positioned on a work piece to be cut and the straight edge of the guide indexed while the guide remains on the work piece so as to accommodate the offset position of the blade relative to the base plate of the cutting tool such that the mating of the edge of the base plate with the straight edge or fence of the guide assures a straight and accurate cut.

The present invention achieves the above and other objects by providing a guide for a hand held power cutting tool of the type having a blade extending through a base plate wherein the guide is adjustable on the work piece to compensate for an offset distance between an edge of the base plate and the blade. The guide comprises an assembly that includes a carriage which is movable and a carriage stop which is adjustable relative to the end of the carriage. The distance between the carriage stop and the end of the carriage is adjusted to equal the offset between the saw blade and the end of the base plate of the saw. The assembly further includes a straight edge or fence that mates with the edge of the base or sole plate of the cutting tool to allow a straight cut. A non-skid surface is attached to the underside of the carriage and placed against the work piece to attach the carriage to the work piece without any external clamping device and the like and allows the assembly including the straight edge and carriage stop to move relative to the carriage. Once the carriage stop is adjusted from the end of the carriage to a distance equal to the offset of the blade relative to the base plate, the straight edge of the guide is placed on the cut line. Movement of the assembly away from the cut line and relative to the carriage until the carriage stop contacts the end of the carriage places the straight edge of the guide at the correct offset distance. Mating the base plate of the saw with the straight edge of the guide allows an accurate and straight cut across the work piece. The guide optionally includes means to adjust for the thickness (kerf)

of the blade. This enables the user to place the resultant kerf of the blade on either side of a point where the cut is desired.

These and other features and advantages of the present invention will become more apparent with reference to the following detailed description of the drawings.

BRIEF DESCRIPTION OF DRAWINGS

FIG. 4 is an exploded view of the carriage assembly.

FIG. 5 is a top plan view of the friction pad that makes contact with the work piece.

FIG. 6 is a top plan view of the spring plate with leaf springs attached.

FIG. 6a is a side view of the spring plate.

FIG. 7 is a side view of the carriage block with the flippable kerf adjustment screw.

FIG. 7a is an exploded top view of the carriage block showing the pivot block and kerf adjustment screw.

FIG. 7b is a bottom view of the carriage block.

DETAILED DESCRIPTION OF THE DRAWINGS

Figure 1:
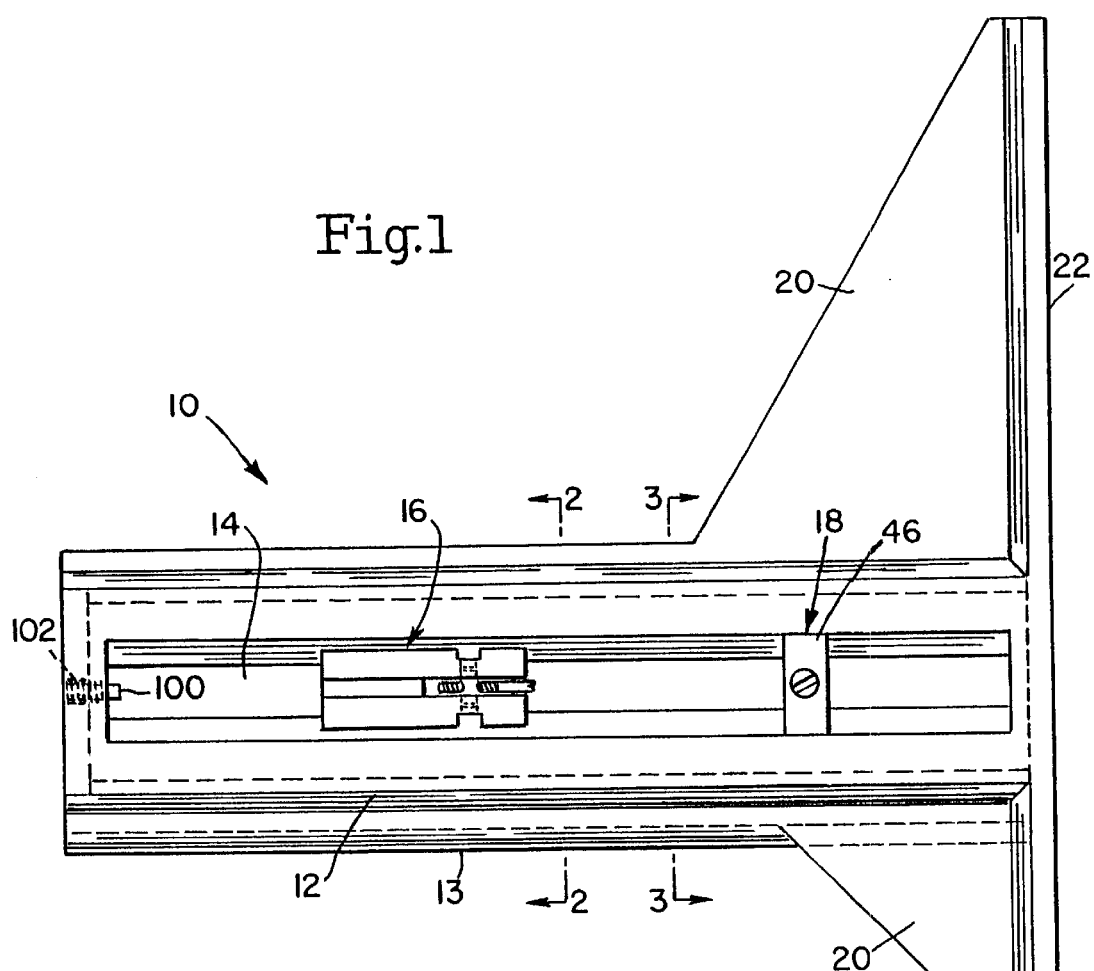
FIG. 1 is a top plan view of the saw guide of this invention

The saw guide of the present invention is shown in FIG. 1 as reference numeral 10. Guide 10 includes a base 12 formed of a rigid homogeneous material such as metal or plastic. The base 12 retains all of the other components of the guide in a workable relation to each other.

Base 12 of guide 10 includes a longitudinal slot 14 placed approximately from one end of base 12 to the other end which allows placement of carriage assembly 16 and dead stop assembly 18. As will be further explained below, carriage assembly 16 and dead stop assembly 18 are placed within slot 14 to allow relative movement between dead stop 18 and carriage assembly 16, and between base 12 and the work piece. Placed at one end of saw guide 10 is an extension area 20 which extends perpendicular to the longitudinal axis of base 12 and is for the purpose of extending the contact of the sole plate of the saw or tool for the purpose of 90° alignment at the start and exit of a cut. Guide plane 20 includes a guide rail or fence 22 against which the side edge of the sole or base plate of the cutting saw is placed during the cutting process to allow a smooth and steady cut across the workpiece. While the saw guide of FIG. 1 is shown with a slot 14 to accommodate relative set movement between carriage assembly 16 and dead stop assembly 18, other arrangements are readily contemplated that one of ordinary skill in this art would understand. For example, instead of a slot 14, the carriage assembly 16 could be placed on a monorail-type form in which the carriage assembly 16 could be U-shaped to ride on the monorail and wherein the legs of the carriage assembly would contact the surface of the workpiece. Relative movement between the carriage assembly 16 and dead stop assembly 18 would be along the monorail. Accordingly, the exact shape or configuration of base 12 is not critical to the invention so long as there can be provided relative movement between the base and the carriage assembly and that the carriage assembly can remain stationary with respect to the workpiece.

Figure 2:
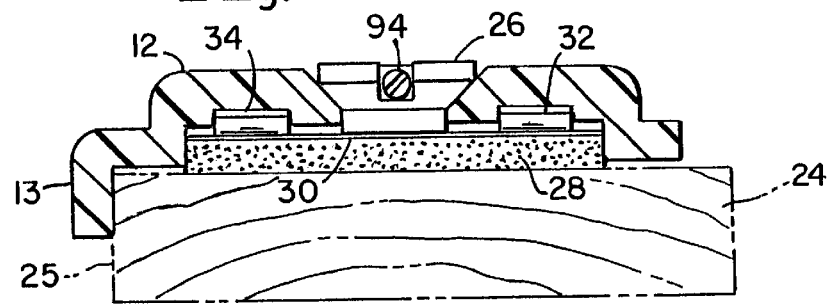
FIG. 2 is a vertical cross-section of the guide through line 2—2 of FIG. 1.

The carriage assembly 16 can be best described by referring to FIG. 2 and FIGS. 4–7b. The carriage assembly 16 is positioned to move relative to base 12 and, accordingly, the carriage assembly must be movable within guide 10 and at the same time remain stationary with respect to the workpiece 24. It is the carriage assembly 16 which maintains the guide 10 in registration on the workpiece. Importantly, this is done without external clamping devices as are typically used in the prior art to secure the saw guides to the workpiece. Carriage assembly 16 includes a carriage block 26 which is shaped to accommodate the shape of slot 14 in base 12. As shown, slot 14 has an expanding bevel-type shape on both sides, while carriage block 26 is Y-shaped to accommodate the beveled edges of slot 14. Obviously other slot shapes and complementary carriage block shapes can be used, again so long as relative movement can be readily achieved between the base 12 and carriage assembly 16. The carriage assembly 16 remains stationary with respect to the workpiece due to the presence of friction plate 28, which can be made of a non-skid material which creates sufficient friction with workpiece 24 that during movement of the base 12 across the workpiece, friction plate 28 and carriage assembly 16, which are rigidly attached, remain stationary against the work surface. Friction plate 28 can be made of a rubbery material or other non-skid natural or synthetic material. To help ensure that the friction plate 28 remains stationary with respect to the work surface 24 during movement of base 12, a spring plate 30 is placed intermediate carriage block 26 and friction plate 28. Spring plate 30 includes a pair of leaf springs 32 and 34, which lightly contact the undersurface of base 12 during movement of base 12 along workpiece 24. As base 12 is moved relative to the workpiece, a slight downward pressure is applied. The base 12 can readily slide over leaf springs 32 and 34 while at the same time the minimum downward pressure is applied to the leaf springs which translates to friction plate 28 to maintain the friction plate 28 stationary with respect to the workpiece 24. To provide additional stability to the saw guide 10 during movement of base 12 relative to the workpiece, base 12 can include a vertical extension 13 which hangs over the edge 25 of the workpiece 24 as shown in FIG. 2 to provide 90° registration of the fence 22 to the workpiece. Thus, the guide 10 is maintained on the workpiece 24 via friction plate 28 and the additional vertical guide 13.

Referring to FIGS. 4, 6, 6a, and 7b, it can be seen that spring plate 30 containing leaf springs 32 and 34 are attached to the underside 36 of carriage block 26 via screws 38 which are mounted through the four screw holes 40 placed through spring plate 30 and attached to the underside 36 of carrier block 26 via pairs of screw holes 42 on opposite ends of carrier block 26. When spring plate 30 is attached to carrier block 26, it can be seen that the underside 44 of base 12 on either side of slot 14 will be lightly contacted by leaf springs 32 and 34 as downward pressure is applied to base 12. As previously said, the pressure of base 12 on the leaf springs 32 and 34 maintains the friction pad 28 and carrier assembly 16 stationary with respect to the workpiece 24. Base 12 is readily able to slide over the work piece 24 and top surfaces of leaf springs 32 and 34 to allow relative movement between base 12 and the workpiece 24. Friction plate 28 is attached to the underside of spring plate 30 by any available means. The use of an adhesive is preferred, although other attachment means can be used such as screws, hook and loop fasteners, etc.

Figure 3:
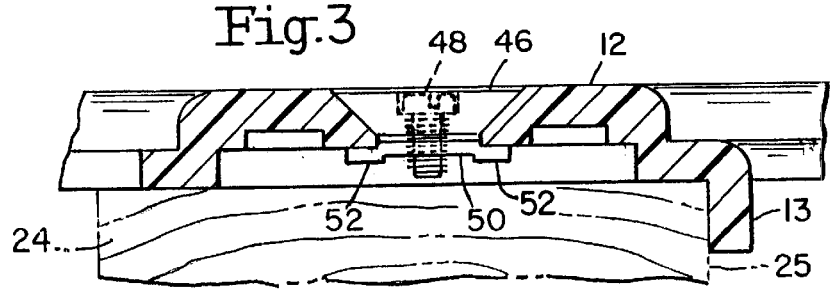
FIG. 3 is a vertical cross-section of the guide through line 3—3 of FIG. 1.

To allow guide 10 to compensate for the offset distance between the saw blade and the edge of the base plate of the saw and achieve the desired cut, the guide 10 further includes a carriage stop 18 which is shown in FIG. 1 and FIG. 3. The carriage stop 18 includes a clip 46 which is complementary shaped to slot 14 so as to allow movement, when desired, of the carriage stop 18 along slot 14. The carriage stop 18 is lockable in the desired location by means of screw 48 and nut S0 which includes wings 52 that extend beyond the width of slot 14 and contact the underside of base 12 when screw 48 is threaded through clip 46 and nut 50. Screw 48 tightens wings 52 against the underside of base 12 to lock carriage stop 18 in place along slot 14 at the desired distance from carriage assembly 16. The desired distance is equal to the offset between the saw blade and the end of the base or sole plate of the saw. To provide movement of carriage stop 18 to adjust for the correct offset distance, screw 48 is turned to detach the wings 52 from underside base 12. At this point, the carriage stop 18 can be slid along slot 14 to the desired distance and screw 48 again tightened to lock the wing nut 50 against the underside of base 12. While carriage stop 18 is shown as a screw and wing nut combination, other lockable devices can be used. For example, a pressure clip device can be used whereby squeezing the clip releases the clip from the base for movement. Instead of a screw, a lock pin or snap device can be used to secure the carriage stop 18 in position.

The basic operation of saw guide 10 of the present convention to allow the user of a power saw to provide a straight and accurate cut across the board can be described with respect to FIGS. 8a–8d. In general, the saw guide 10 allows the user of a power saw to compensate for the offset distance between the saw blade and the end of the base or sole plate of a power saw. A power saw for which the saw guide 10 is particularly useful is shown, in general, in FIG. 8d as reference numeral 54. The saw 54 typically includes a saw blade which would be encased within the saw blade cover 56. The notch 58 of the guide plate 60 illustrates where the saw is relative to the sole plate 60. As can be seen, there is an offset distance between the saw blade as indicated by notch 58 and the end 62 of the sole plate 60. While notch 58 often allows the user to maintain a sight line on the cut to be made, often, the dust and debris from the cut during the cutting process obscures the line. Once the saw gets off track, saw vibration and the obscured cut line do not readily allow the user to get back on the correct line, and as a result the exact cut is not made. The saw guide 10 of the present invention compensates for the offset difference between the saw blade and the end of the sole plate, and provides a steady guide surface which allows a straight and accurate cut.

Figure 8A:
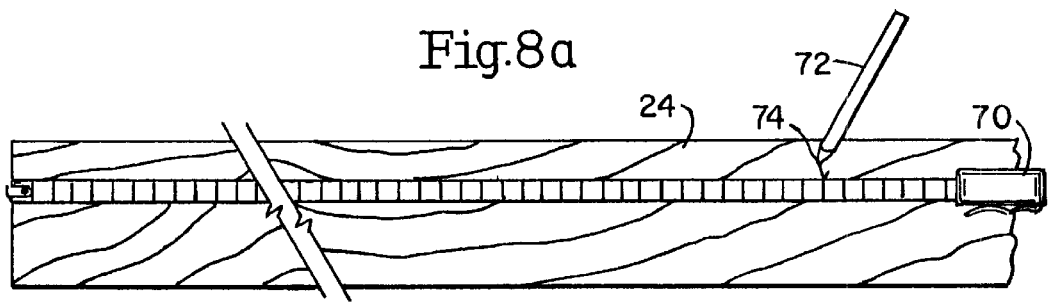
FIG. 8a shows a board with tick mark being made at the desired measurement.
Figure 8B:
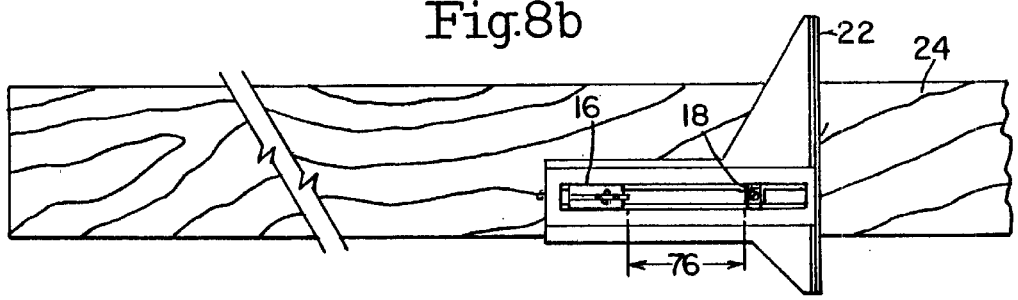
FIG. 8b shows the guide positioned on the board with the fence lined up on the tick mark.
Figure 8C:
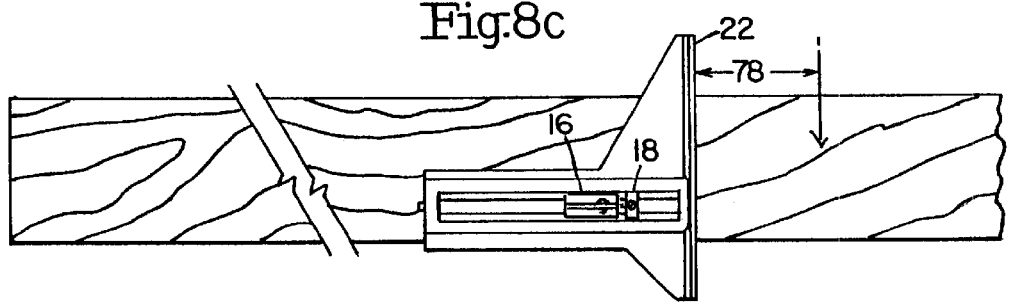
FIG. 8c shows the index movement of the guide to the adjustable stop.
Figure 8D:
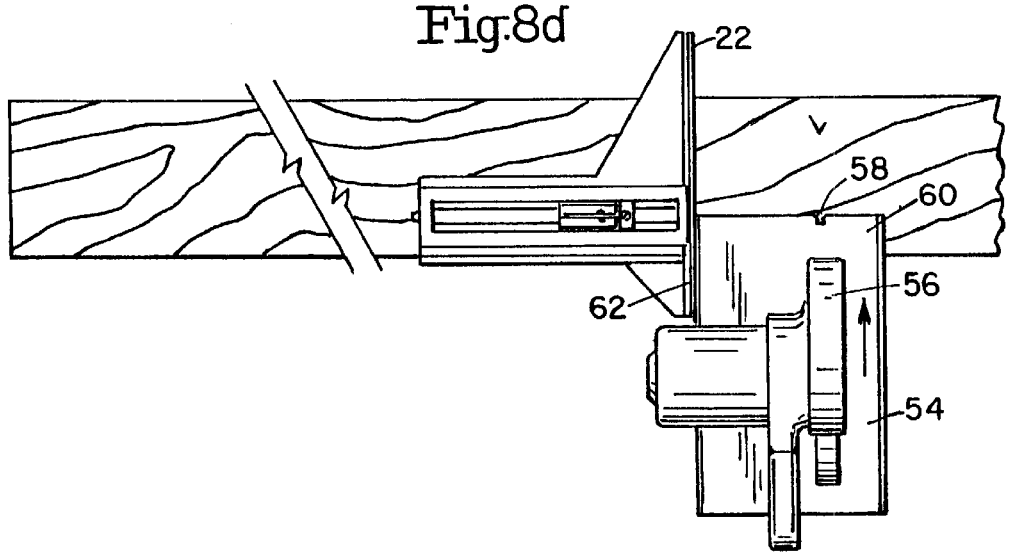
FIG. 8d shows the saw in alignment with the guide fence ready to part the board.

Referring to 8a, a tape measure 70 can be used to measure the length of the workpiece 24 to the desired length. A marking utensil such as pencil 72 can be used to make a mark 74 on the workpiece 24 which indicates the cut point. Although not shown, a T-square or guide rail 22 of guide 10 can be placed across workpiece 24 and a line drawn across the width of the board to define the full cut line, although a full cut line is not necessary. In FIG. 8b, the saw guide 10 is placed against the mark 74 such that guide rail 22 provides a straight line across the workpiece 24 at the location of mark 74. At this point, the carriage assembly 16 should be at the far rear end of slot 14. The offset distance between the saw blade and the end 62 of the sole or guide plate 60 can be measured by the carpenter. This offset distance is now provided between the carriage assembly 16 and the carriage stop 18. The offset distance is provided by maintaining the carriage assembly 16 at the rear end of slot 14, and moving the carriage stop 18 along slot 14 such that the distance indicated by reference numeral 76 between the front end of carriage assembly 16 and the rear end of carriage stop 18 is the same as the offset distance between the saw blade and the end 62 of sole plate 60. Once the correct distance between the carriage assembly 16 and the carriage stop 18 is provided along slot 14, the carriage stop 18 is locked in place by tightening screw 48 and wing nut 50 as described with respect to FIG. 3. To now adjust for the offset distance between the saw and the end 62 of sole plate 60 on the workpiece 24, pressure is lightly applied onto the base 12 of guide 10 and the guide shown in FIG. 8c is moved away from mark 74 until the carriage stop 18 contacts the front end of carriage assembly 16. Carriage assembly 16 remains stationary with respect to workpiece 24 due to the friction pad. Once the carriage stop 18 contacts the front end of carriage assembly 16, guide 10 is in place and, in particular, guide rail 22 is spaced from mark 74 at a distance 78 equal to the distance 76 between carriage assembly 16 and carriage stop 18, which itself equals the offset distance between the blade of saw 60 and the end of sole plate 62. Finally, as shown in FIG. 8d, the end of sole plate 62 is placed against guide rail 22 and the saw 54 moved across board 24 to provide the cut accurately along the path across the board which includes mark 74. In practice, it may be useful to provide several practice cuts on a scrap board to ensure that the distance between the carriage stop 18 and the carriage assembly 16 has been properly adjusted to the exact offset distance between the saw blade and the end of the sole plate of the saw. The distance between the carriage stop 18 and carriage assembly 16 can be simply adjusted by unscrewing screw 48 and adjusting the distance of the carriage stop 18 along the slot or groove 14 of base 12.

An important feature of the saw guide 10 of the present invention which can be added is a kerf offset adjustment means which compensates for the thickness of the saw blade. Accordingly, not only will the saw guide 10 adjust for the distance between the saw blade and the end of the sole or guide plate of the saw, but will further adjust for the thickness of the saw blade and for the side of the mark 74 on which the cut will occur. Thus, different saw blades are often used on the same job, and, accordingly, the saw guide 10 of the present invention can adjust for the different thicknesses of the saw blades which are utilized. The kerf adjustment is shown in FIGS. 7 and 7a. As shown in FIGS. 7 and 7a, the carriage block 26 includes a slot 80 placed across the entire length of the top surface 82 of block 26 and includes a cutout portion 84 which ranges from the top 82 of carriage block 26 into the body of the carriage block. A transverse feature cut 86 into carriage block 26 intersects slot 84 and is placed within the cutout portion 84. A pivot pin 88 is placed within transverse feature cut 86. Pivot pin 88 includes a threaded hole 90 through which a kerf adjustment screw 92 is placed. The kerf adjustment screw can be threaded into hole 90 of pivot pin 88 to change the distance the end 94 of kerf adjustment screw 92 protrudes from the edge 96 of carriage block 26. During the set up of guide 10, the kerf adjustment screw is rotated within the hole 90 of pivot pin 88 so as to protrude from the right side of carriage block 26. The distance from the end 96 of carriage block 26 that kerf adjustment screw 92 protrudes from the carriage assembly equals the distance of the width or kerf of the saw blade which is in use. Once the kerf adjustment is made, the operation of the saw guide 10 to compensate for the offset distance between the saw blade and the end 62 of the sole or guide plate 60 of the saw is made as in FIGS. 8b and 8c.

The kerf adjustment screw 92 compensates for the width of the blade to provide an even further accurate cut. For example, if the board on the left of the cut line or mark 74 is desired, it is important that the kerf adjustment be such that the saw blade essentially cut on the right side of the mark 74 to insure an accurate length of board. Without the kerf adjustment, the guide would bring the saw blade to the center or left of mark 74. The blade thickness would remove board to the left of mark 74 and provide a small but definite error in the length of the desired board. Using the kerf adjustment, the guide accommodates for the sole plate and the thickness of the blade by stopping movement of base 12 before the carriage stop 18 contacts carriage assembly 16. The small protrusion of the kerf adjustment screw places the fence 22 such that the saw blade is to the right of mark 74 so that the blade will not cut through the desired portion of the board. Further, the kerf screw 92 can be rotated within the carriage body 26, so it is possible to provide an accurate cut along the length of the board when the right end of the board is desired. Again referring to FIGS. 7, 8b and 8c, if the board to the right of mark 74 is desired, the kerf adjustment screw is rotated so it does not extend beyond the edge of carriage assembly 16. Movement of base 12 until carriage stop 18 contacts carriage assembly 16 places the blade to the left of mark 74. The cut along this position provides an accurate length of board to the right of mark 74.

Referring again to FIG. 1, guide 10 of this invention can further include an adjustment screw 100 at the rear of the guide to further provide microadjustment of carriage assembly 16 and, in particular, adjustment to the space between carriage assembly 16 and carriage stop 18. Adjustment screw 100 can be provided in a tap hole 102 which is drilled through the rear 104 of base 12. Thus, once carriage stop 18 is placed at the desired distance from carriage assembly 16, further adjustment of the distance can be achieved by turning adjustment screw 100 which would move carriage assembly 16 minutely away from the rear of base 12 to shorten the distance between carriage assembly 16 and carriage stop 18. The adjustment screw 100 would likely be used as a final adjustment to provide the proper offset of the guide to insure that the cutting blade is at the desired location on the workpiece.

The Figures as shown and explained above are for the purpose of illustrating the invention and are not to be so construed as limiting the invention solely to the parts and shapes therein shown. One of ordinary skill in this art could very well ascertain equivalents of the parts illustrated and such equivalents are intended to be covered within the scope of the appended claims.

What is claimed is:

1. A guide for a handheld cutting tool comprising a base, a guide portion on one end of said base capable of traversing the width of a workpiece and for contacting an edge of a sole plate of said cutting tool, a carriage assembly placed on said base and capable of relative movement with respect to said base, a friction surface disposed on an underside of the carriage assembly so that the carriage assembly remains stationary with said workpiece when said guide is placed on said workpiece, a carriage stop being adjustably positionable on said base and lockable to said base, said locked carriage stop being moveable together with said base to a first position where the guide portion is coincident with a cut line, and said carriage stop is spaced away from said carriage assembly, and a second position where said carriage stop is abutting said carriage assembly and said guide portion is spaced from said cut line by a distance equal of the offset distance between a blade of said cutting tool and an end of said sole plate.

2. The guide of claim 1 wherein said base contains a longitudinal slot therethrough, and wherein said carriage assembly and said lockable carriage stop are movable along said slot.

3. The guide of claim 2 wherein said carriage stop includes a clip placed within said slot, a wing nut placed underneath said base and having ends which can contact the undersurface of said base on opposite sides of said slot and a screw which can tighten said clip to said wing nut.

4. The guide of claim 1 wherein said base is formed of metal or plastic.

5. The guide of claim 1 further including a pressure means between said base and said friction surface so as to apply a pressure on said friction surface when said base is moved along said workpiece.

6. The guide of claim 5 wherein said pressure means includes at least one spring.

7. The guide of claim 6 wherein said pressure means includes a pressure plate disposed between said friction surface and the underside of said carriage assembly, said pressure plate including a spring means disposed between said pressure plate and the underside of said base.

8. The guide of claim 7 wherein said pressure plate includes a pair of leaf springs disposed on opposite sides of said slot and positioned between said pressure plate and the underside of said base.

9. The guide of claim 7 wherein said pressure plate is attached to the underside of said carriage assembly.

10. The guide of claim 1 wherein said friction surface is a rubberized or plastic pad which rests between the underside of said carriage assembly and the top of the workpiece.

11. The guide of claim 10 wherein said guide is maintained on the workpiece without the use of any clamping device which holds said guide on to said workpiece.

12. The guide of claim 1 wherein said base has a vertical edge which can overhang the side of a workpiece when said guide is placed on top of said workpiece.

13. The guide of claim 12 wherein said vertical edge is integral with the remaining portion of said base.

14. The guide of claim 1 wherein said carriage assembly includes a means which protrudes from an end of said carriage assembly, the amount of said protruding means which extends beyond the end of said carriage assembly being adjustable so as to compensate for the thickness of the blade of said cutting tool when said base is moved so as to provide contact between said carriage stop and said carriage assembly.

15. The guide of claim 14 wherein said protruding means is an adjustable kerf screw which can be threaded into said carriage assembly to adjust the distance the kerf screw protrudes from the end of the carriage assembly.

16. The guide of claim 15 wherein said carriage assembly includes a longitudinal slot through which said kerf adjustment screw can be turned to adjust the distance said kerf adjustment screw protrudes from the end of the carriage assembly.

17. The guide of claim 16 wherein said carriage assembly includes a transverse slot which intersects the longitudinal slot containing said kerf adjustment screw, said transverse slot including a rotating pin through which said kerf adjustment screw is placed, said rotating pin allowing said kerf adjustment screw to be rotated 180° relative to the end of said carriage assembly.

18. The guide of claim 14 wherein said friction surface is a rubberized pad which is positioned between said workpiece and the underside of said carriage assembly.

19. The guide of claim 18 wherein said guide is maintained on said workpiece without the use of external clamping devices which attach the guide to the workpiece.

20. The guide of claim 19 wherein said base includes a vertical edge portion which can extend over a portion of the thickness of said workpiece to aid in holding the guide to said workpiece and providing right angle registration of the fence to the workpiece.

21. The guide of claim 1 including an adjustment screw contained within said base and which contacts the rear of the carriage assembly for the purpose of microadjustment of the offset.

* * * * *